United States Patent [19]
Dickie

[11] Patent Number: 6,145,612
[45] Date of Patent: Nov. 14, 2000

[54] REMOVABLE BATTERY CASE WITH LOCKING MECHANISM FOR A POWERED WHEELCHAIR

[75] Inventor: Paul C. Dickie, Clovis, Calif.

[73] Assignee: Sunrise Medical HHG Inc., Longmont, Colo.

[21] Appl. No.: 09/166,829

[22] Filed: Oct. 5, 1998

Related U.S. Application Data

[60] Provisional application No. 60/061,709, Oct. 6, 1997.

[51] Int. Cl.[7] ................................................. B60L 11/18
[52] U.S. Cl. ........................................ 180/65.5; 180/90.7
[58] Field of Search .................................... 180/65.5, 907

[56] References Cited

U.S. PATENT DOCUMENTS

| | | | |
|---|---|---|---|
| 1,796,343 | 3/1931 | Pierson | 180/68.5 |
| 1,939,742 | 12/1933 | Wanemaker | 180/68.5 |
| 2,405,251 | 8/1946 | Glaze | 180/68.5 |
| 3,437,164 | 4/1969 | Rabjohn | 180/68.5 |
| 4,140,192 | 2/1979 | Sharpe | 180/DIG. 3 |
| 4,967,864 | 11/1990 | Boyer et al. | 180/65.1 |
| 5,112,076 | 5/1992 | Wilson | 280/657 |
| 5,121,806 | 6/1992 | Johnson | 180/65.5 |
| 5,183,133 | 2/1993 | Roy et al. | 180/252 |
| 5,197,559 | 3/1993 | Garin, III et al. | 180/65.1 |
| 5,249,636 | 10/1993 | Kruse et al. | 180/21 |
| 5,279,513 | 1/1994 | Connelly | 446/219 |
| 5,495,904 | 3/1996 | Zwaan et al. | 180/11 |
| 5,540,297 | 7/1996 | Meier | 180/65.5 |
| 5,697,465 | 12/1997 | Kruse | 180/65.1 |

FOREIGN PATENT DOCUMENTS

| | | | |
|---|---|---|---|
| 0 511 113 A2 | 4/1992 | European Pat. Off. | A61G 5/04 |
| 0236833 | 11/1985 | Japan | 180/68.5 |
| 404349025 | 12/1992 | Japan | 180/68.5 |
| 204372 | 6/1922 | United Kingdom | 180/68.5 |
| 527052 | 3/1939 | United Kingdom | 180/68.5 |

*Primary Examiner*—Christopher P. Ellis
*Assistant Examiner*—Rashmi Sharma
*Attorney, Agent, or Firm*—MacMillan, Sobanski & Todd, LLC

[57] ABSTRACT

A wheelchair battery mounting system comprises a battery box assembly and a battery support assembly for supporting the battery box assembly. The battery box assembly includes battery box bottom and lid. The battery support assembly includes a battery cage and a handle pivotally mounted to the battery cage. The handle has two ends. Each end is provided with an interference member. Stops are mounted on wheelchair side frames. The interference members are engageable with the battery stops when the battery support assembly is installed on the wheelchair and the handle is rotated downward.

20 Claims, 6 Drawing Sheets

REMOVABLE BATTERY CASE WITH LOCKING MECHANISM FOR A POWERED WHEELCHAIR

CROSS-REFERENCE TO RELATED APPLICATIONS

This application claims the benefit of U.S. Provisional application Ser. No. 60/061,709, filed on Oct. 6, 1997.

TECHNICAL FIELD

This invention relates in general to wheelchairs, and in particular to motorized wheelchairs powered by a battery. More particularly, this invention pertains to a wheelchair battery mounting system that provides improved ease in installing and removing the battery from the wheelchair.

BACKGROUND OF THE INVENTION

Motorized wheelchairs are commonly powered with an electric motor. A rechargeable battery is typically mounted beneath the wheelchair seat and electrically connected to the electric motor. It would be advantageous if the battery could be mounted in a readily removable manner so that the battery could be removed from the wheelchair, such as for transporting or replacing the battery. Further, it would be helpful if the battery could be secured so that it is immobile once installed on the wheelchair.

SUMMARY OF THE INVENTION

The above object as well as other objects not specifically enumerated are achieved by a motorized wheelchair that includes a battery box assembly comprised of a battery box bottom and lid, with a battery being placed in the battery box bottom. A battery support assembly includes a battery cage, which is made of side bars and a bottom support bar. Battery mount brackets each contain a pivot orifice for mounting a handle in a pivoting or swiveling motion to enable the entire battery box and battery cage to be picked up and repositioned as desired.

The handle has battery lock pieces that rotate upward and press against battery lock receivers rigidly mounted on the side frame, thereby securing the battery cage and box in place on the wheelchair. The top plates of the motor gearboxes each contain two spaced-apart posts. The posts are configured to accept the alignment holes in the battery mount brackets of the battery cage, so that the installation of the battery cage involves positioning the battery cage alignment holes over the posts and lowering the battery cage onto the top plate. The mounting system of the invention provides additional structure to the wheelchair by adding a substantial transverse connection between the side frames of the wheelchair.

DETAILED DESCRIPTION OF THE INVENTION

Figure 1:
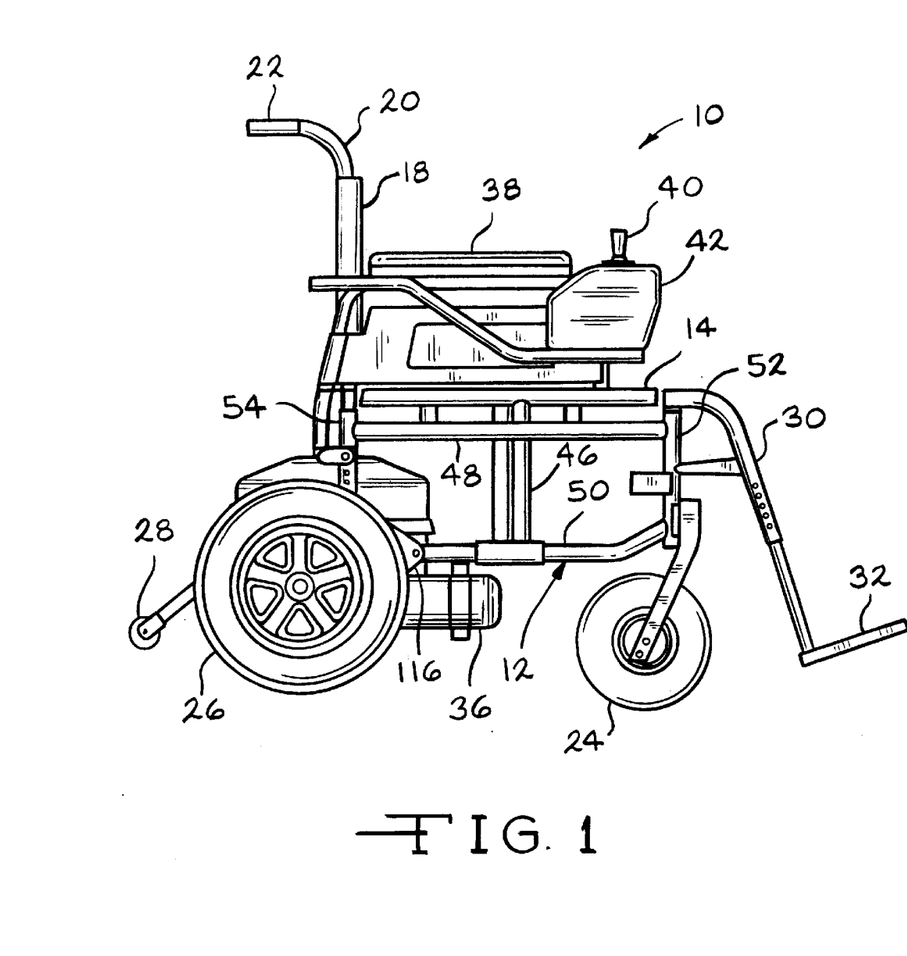
FIG. 1 is a side view in elevation of a motorized wheelchair having a battery mounting system according to the invention.
Figure 2:
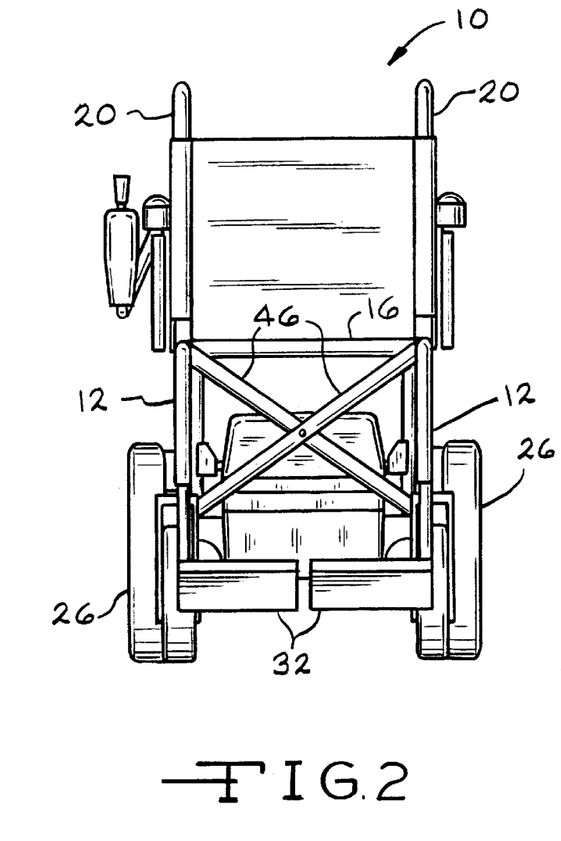
FIG. 2 is a front view in elevation the wheelchair of FIG. 1.
Figure 3:
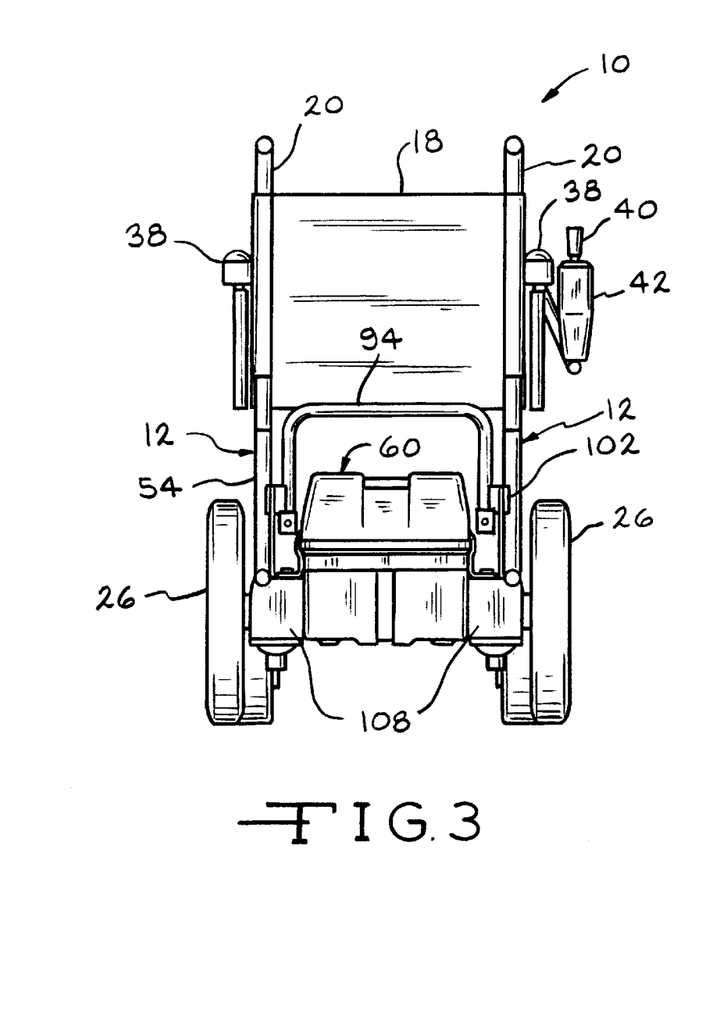
FIG. 3 is a rear view in elevation the wheelchair of FIG. 1.
Figure 7:
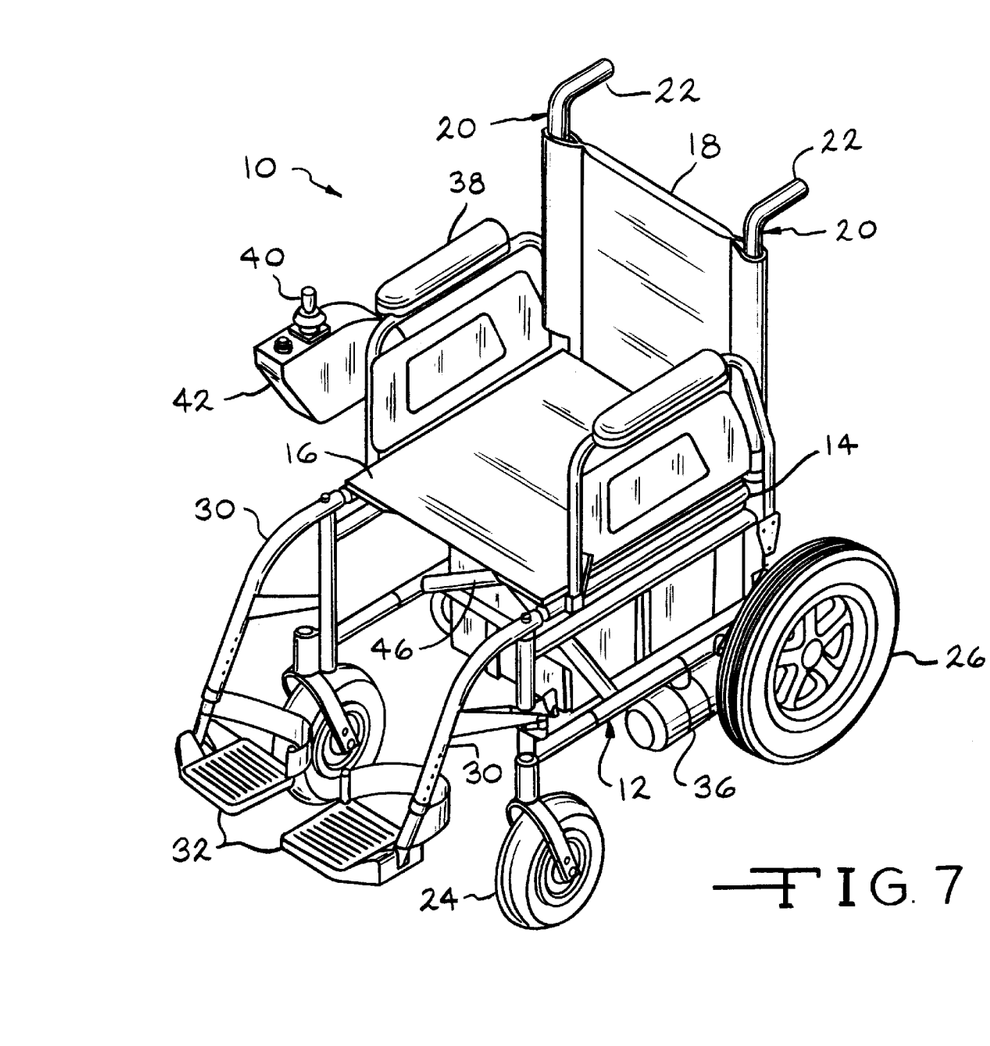
FIG. 7 is a schematic view in perspective of the motorized wheelchair of FIG. 1.

As shown in FIGS. 1–3 and in FIG. 7, a wheelchair is indicated generally at 10. The wheelchair 10 is generally comprised of left and right side frames 12, on which is mounted a seat rail 14 and a seat 16. A seat back 18 is mounted on seat posts 20 that are inserted into the side frames 12. The seat posts 20 have push handles 22 that permit the wheelchair 10 to be pushed by an attendant. Each side frame 12 provides a mounting for a front caster wheel 24 and a rear drive wheel 26. Anti-tip wheels 28 are also provided to reduce the risk of rearward tipping of the wheelchair 10. The side frames 12 also support the leg rest assembly 30 with its folding foot rests 32. Electric motors 36 are mounted to the left and right side frames 12 for powering the rear drive wheels 26. Also mounted on the side frames 12 are armrests 38. A control or joysticks 40 and controller 42 are fixed to one of the armrests 38 to enable the wheelchair occupant to operate the wheelchair motors 36 and therefore control movement of the wheelchair 10.

It can be seen that the wheelchair 10 is adapted for folding. The seat 16 and the seat back 18 are collapsible or foldable webs of fabric or upholstery. A folding cross brace assembly 46 is operatively connected to the left and right side frames 12 to provide structure and rigidity to the wheelchair 10 when the wheelchair 10 is being operated. The folding capability of the cross brace 46 will allow the wheelchair 10 to collapse or fold for transportation or storage.

As shown in FIG. 1, the side frame 12 is generally comprised of a top tube 48 and a bottom tube 50, which are oriented generally horizontally. The top tube 48 and bottom tube 50 are joined together by a front tube 52 and a back tube 54, both of which are oriented generally vertically. The leg rest assembly 30 and caster wheels 24 are mounted on the front tube 52.

Figure 4:
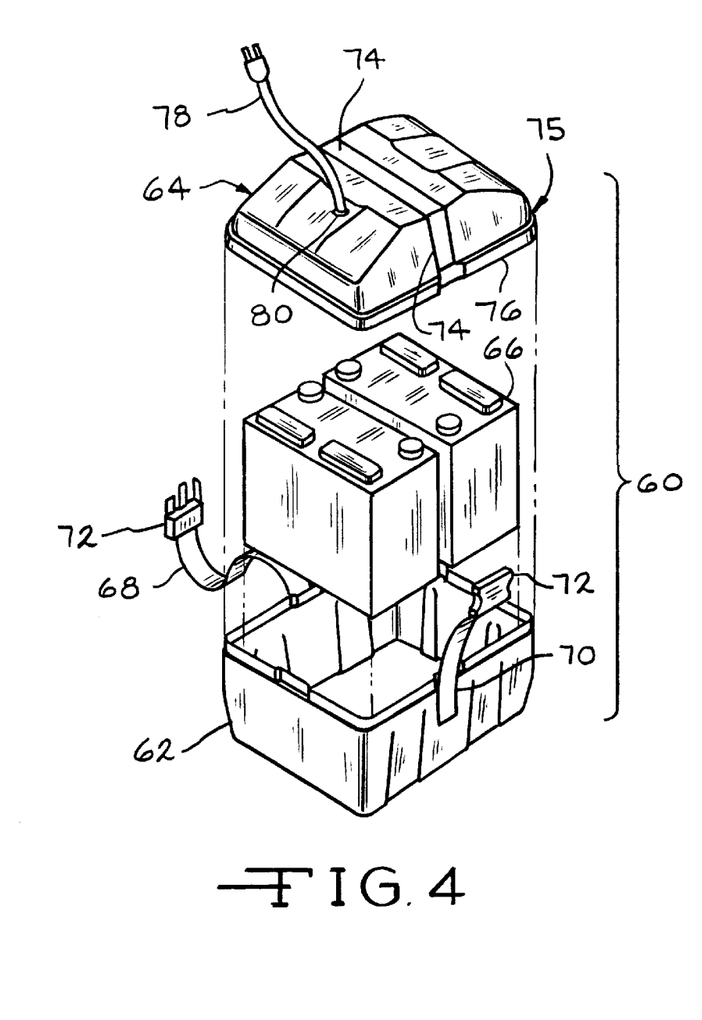
FIG. 4 is an exploded schematic view in perspective of a battery box assembly according to the invention.

A battery box assembly 60 is mounted beneath the seat 14 for powering the motors 36. As shown in FIG. 4, the battery box assembly 60 is comprised of a battery box bottom 62 and a battery box lid 64 which is engageable with the battery box bottom 62. The battery box bottom 62 and the battery box lid 64 cooperate to receive a battery 66. The battery box bottom and lid 62 and 64 are preferably made of a strong, light weight material, such as molded polyethylene. Preferably the material of the battery box bottom and lid 62 and 64 is also resistant to corrosive agents, such as battery acid. Battery box straps 68 and 70 are attached to the battery box bottom 62, and are fastenable to each other and across the battery box lid 64 with a snap buckle assembly 72 when the battery box lid 64 is placed on the battery box bottom 62. To ensure that the straps 68 and 70, and the buckle assembly 72 stay in place when the battery box straps 68 and 70 are fastened to each other and across the battery box lid 64, a track or groove 74 is molded into the battery box lid 64. The groove 74 is provided for receiving the battery box straps 68 and 70 in place and maintaining the battery box straps 68 and 70 in the grooves 74. Further, a protruding rim 76 surrounds the perimeter 75 of the battery box lid 64. This protruding rim 76 helps provide a good fit, or fits snugly, with the battery box bottom 62, and also provides dimensional and structural rigidity to the battery box lid 64. The term "snugly fits" means that the dimensions of the battery box bottom 62 are within a close tolerance of the dimensions of the protruding rim 76 so that the battery box bottom 62 at least slightly frictionally engages the protruding rim 76. The strap groove 74 extends into the protruding rim 76 to help maintain the straps 68 and 72 in place. A battery cord 78 passes through an opening 80 in the battery box lid 64. One end of the battery cord 78 is provided with a connector for connection with a mating cord (not shown) leading to the controller 42 and joystick 40. It should be clearly understood that an opposite end of the battery cord (not shown) is electrically connectable to the battery 66 in any suitable manner.

Figure 5:
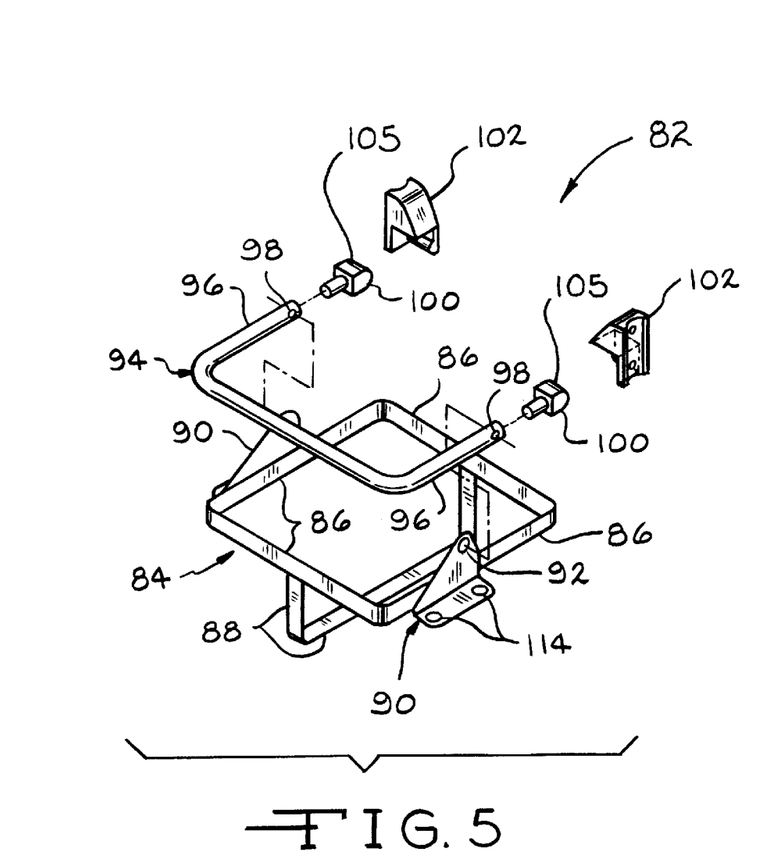
FIG. 5 is an exploded schematic perspective view of a battery support assembly according to the invention.

The battery support assembly 82, shown in FIG. 5, is provided for supporting the battery box assembly 60. The battery support assembly 82 includes a battery cage 84, which is made of a plurality of side bars 86 and a bottom support bar 88. The battery cage 84 is sized so that the battery box assembly 60 will fit in the battery cage 84 without excessive free movement or play. Mounted on the side bars 86, such as by welding or bolting, are left and right battery mount brackets 90. The battery mount brackets 90 each contain a pivot orifice 92 suitable for pivotally mounting a handle 94. It should be understood that the handle 94 may be pivotally mounted directly to the battery cage 84 or indirectly to the battery cage 84, such as to the battery mount brackets 90. The handle 94 provides an easy way for the entire battery box assembly 60 (clearly shown in FIG. 4) and battery support assembly 82 to be picked up and repositioned as desired. For example, the handle 94 provides an easy way for the attachment or installation of the battery box 60 and cage 84 onto the wheelchair 10 (shown in FIGS. 1–3 and 7). The handle 94 also provides an easy way for the removal of the battery box 60 and cage 84 from the wheelchair 10, such as for transporting or replacing the battery 66.

Figure 8:
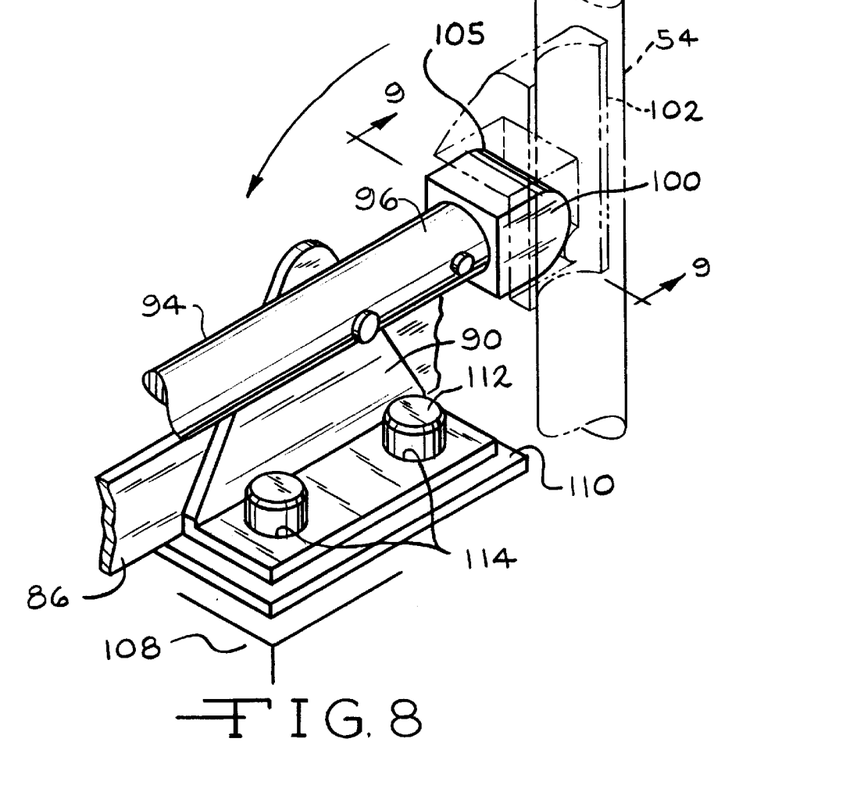
FIG. 8 is an enlarged partial perspective view of the locks of the support assembly shown in FIG. 5.
Figure 9:
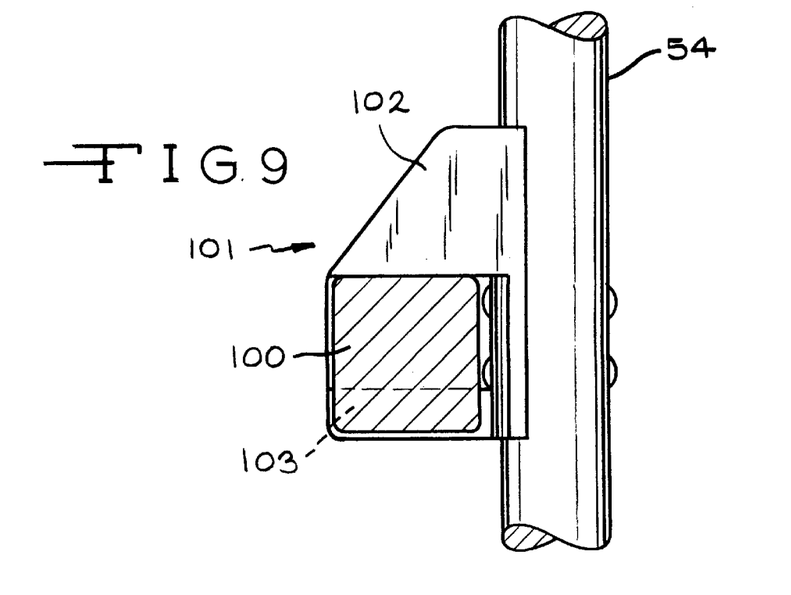
FIG. 9 an enlarged cross-sectional view of the locks taken along the lines 9—9 in FIG. 5.

The handle 94 is generally in the shape of a squared "C", forming two ends 96, each of which has a pivot bolt orifice 98 for insertion of a bolt (not shown). Other shapes for the handle 94 can be used. The extreme end points of the handle ends 96 are provided with interference or members battery lock pieces 100. The battery lock pieces 100 are engageable with battery stops or lock receivers 102 on the side frames 12 of the wheelchair 10 to form a lock 101. When the battery box 60 and cage 84 are installed on the wheelchair 10, and when the handle 94 is rotated downward, from the generally vertical position, as shown in FIG. 3, to a generally horizontal position, as shown in FIG. 5, the battery lock pieces 100 will correspondingly rotate upward in a seesaw fashion, and engage or press against the battery lock receivers 102 that are rigidly mounted on the back tube 54 of the side frame 12, thereby holding the battery cage 84 downwardly on the wheelchair 10. In this manner, the battery box 60 and cage 84 will be secured in place on the wheelchair 10. The lock pieces 100 and the lock receivers 102 frictionally engage one another, holding the handle 94 in a generally horizontal position and holding the battery cage 84 in place. As shown in FIGS. 8 and 9, this frictional engagement can be accomplished by providing a nodule 103 on each of the lock receivers 102 which must be traversed by the lock pieces 100 as the handle 94 is rotated downward to a generally horizontal position. The lock pieces 100 may each be provided with a curved surface 105 to function as a cam surface for engaging the nodule 103 as the lock piece 100 traverses the nodule 103. It should be understood that a single lock piece 100 could be supported on a lever (not shown) separate from the handle 94. A stop 102 may be provided on the battery cage 84 and a lock piece 100 may be supported on a separate lever (not shown) that is pivotally attached to the side frame 12.

It should also be understood that other lock configurations may be employed. An alternative lock 101' is shown, for example, in FIG. 10. This lock configuration is comprised of lock pieces 100' supported by the ends 92 of the handle 94. The lock piece 100' shown is supported at an angle relative to the handle 94. For example, the vertical axis of the lock piece 100' shown is disposed at an angle, indicated as θ, of about 110° relative to the longitudinal axis of the handle 94. It should be understood that the lock piece 100' can be supported at other angles, including 0°. A lock receiver 102' is supported by each side frame 12. The lock piece 100' has a protruding member 107 and a relief 109. The protruding member 107 is formed in part by a curved surface 105' which functions as a cam surface. Similarly, the lock receiver 102' has a relief 111 and a protruding member 113. The lock receiver 102' further has a ramp surface 115 communicating with the protruding member 113. The relief 111 of the lock receiver 102' has a shape that closely conforms to the shape of the protruding member 107 of the lock piece 100'. Moreover, the protruding member 113 of the lock receiver 102' has a shape which closely conforms to the shape of the relief 109 of the lock piece 100'.

Figure 10:
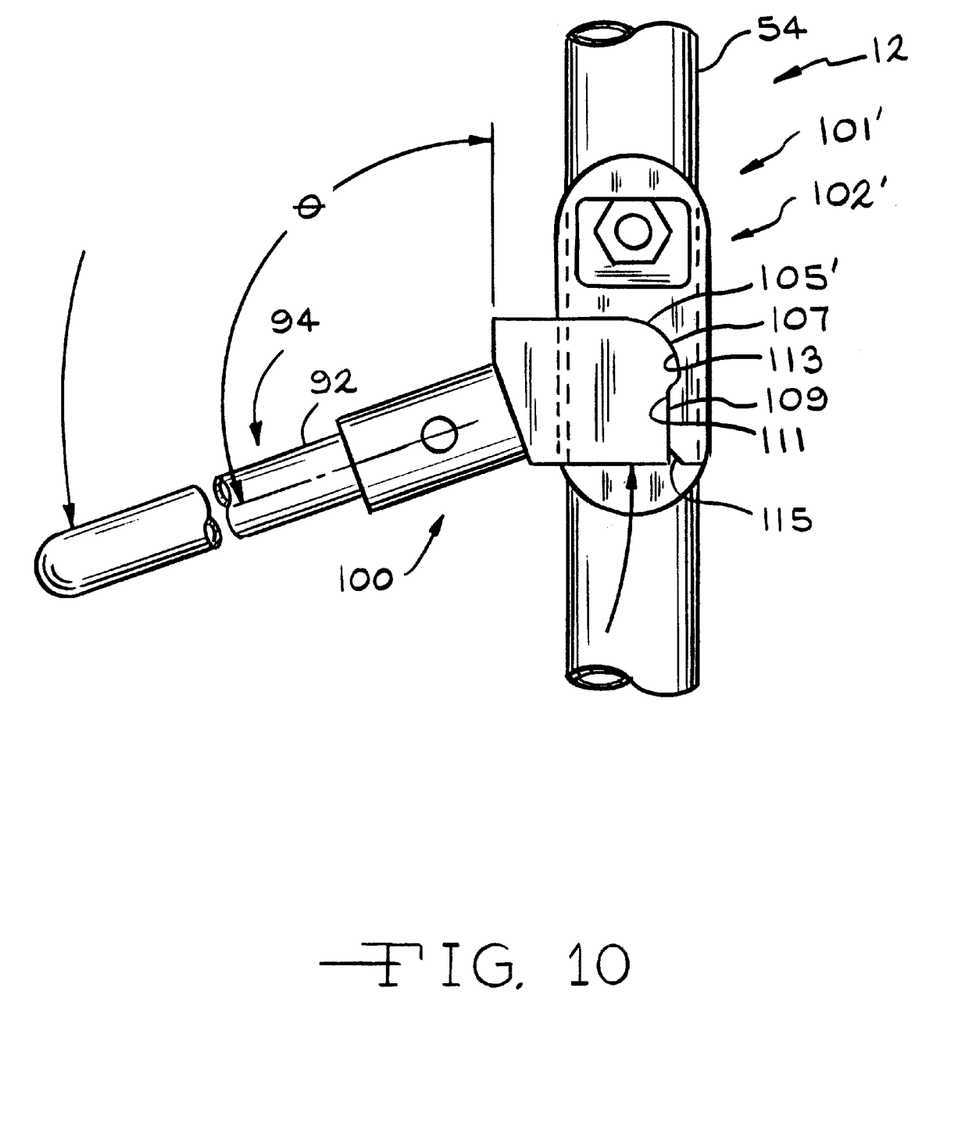
FIG. 10 is a schematic view in elevation of an alternative lock for the support assembly.

In operation, the alternative lock piece 100' engages the lock receiver 102' by pivotally displacing the handle 94. As the handle 94 is rotated downwardly, the ends 92 of the handle 94 rotate upward. The curved cam surface 105' of the lock piece 100' first engages the ramp surface 115 of the lock receiver 102'. The protruding members 107 and 113 then traverse one another. Finally, the protruding member 107 of the lock piece 100' engages the relief 111 of the lock receiver 102' and the protruding member 113 of the lock receiver 102' engages the relief 109 of the lock piece 100'. As is clearly shown, the lock piece 100' and lock receiver 102' closely conform to one another to form a tight frictional fit between the lock piece 100' and lock receiver 102'. To disengage the lock piece 100' and lock receiver 102', force applied to displace the handle 94 has to be sufficient to overcome the frictional engagement. It should be understood that the frictional engagement is sufficient to permit displacement of the handle 94 yet reduce the risk of inadvertent displacement of the handle 94.

In addition to the foregoing locks, other locks may be employed. For example, locks could be comprised of releasably engageable pieces, such as hook and loop type fasteners (not shown). A magnet (not shown) may be provided for engagement with a metal surface or for engagement with another magnet. An automated actuator (not shown) may be employed for retaining the battery cage 84 in a substantially fixed position. These lock examples are not exhaustive but are merely illustrative of other locks that may be used.

Figure 6:
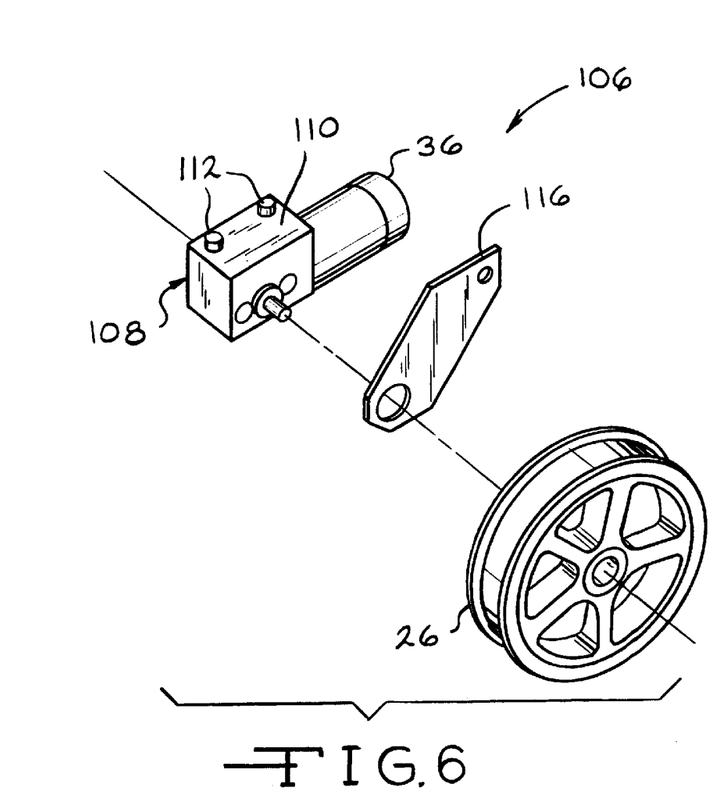
FIG. 6 is an exploded schematic perspective view of a motor gearbox assembly associated with the right motor of the wheelchair of FIG. 1.

As shown in FIG. 6, a right motor assembly 106 includes a right motor 36 and a gearbox 108. A top plate 110 of the gearbox 108 is provided with two spaced-apart posts 112. The posts 112 are configured to be accepted by alignment holes 114 in the battery mount brackets 90 of the battery cage 84, so that the installation of the battery cage 84 involves positioning the battery cage alignment holes 114 over the posts 112 and lowering the battery cage 84 onto the top plate 110 of the gearbox 108. The motor assembly 106 includes a motor plate 116 for covering the gearbox 108, and further includes the rear drive wheel 26. The motor plate 116 also acts as a mounting bracket for mounting the motor 36 and gear box 108 to the back tube 54 of the side frame 12. Further, the motor plate 116 provides the mounting surface for both the anti-tip wheels 28 and the rear wheel lock (not shown). The left motor assembly (not shown) is substantially identical to, but generally a mirror image of, the right motor assembly 106. Moreover, the alignment holes of the left battery mount bracket of the battery cage 84 line up with and receive the posts on the left motor assembly (not shown) in the same manner as on the right hand side.

One of the particular advantages of the mounting system of the invention is that the rigidity of the battery box 60 and cage 84 provide additional structural rigidity to the wheelchair 10. This accomplishes the function of adding a substantial transverse connection between the posts 112, and hence the side frames 12, on either side of the wheelchair 10. This additional structure is beneficial in stabilizing the folding wheelchair 10, as shown.

The principle and mode of operation of this invention have been described in its preferred embodiment. However, it should be noted that this invention may be practiced otherwise than as specifically illustrated and described without departing from the scope of the invention.

What is claimed is:

1. A wheelchair battery mounting system for use with a wheelchair having side frames, said battery mounting system comprising
    a battery box assembly including:
        a battery box lid engageable with said battery box bottom;
    a battery support assembly provided for supporting said battery box assembly, said battery support assembly including:
        a battery cage;
        a handle mounted to said battery cage;
    a lock for retaining said battery support assembly in a substantially fixed position; and
    a plate having a post, said battery cage comprising a battery mount bracket having an alignment hole therein, said post being configured to be accepted by said alignment hole in said battery mount bracket, said alignment hole being positionable over said post upon lowering said battery cage onto said plate.

2. The wheelchair battery mounting system of claim 1, further including
    battery box straps attached to said battery box bottom, said battery box straps being fastenable together and across said battery box lid when said battery box lid is placed on said battery box bottom to hold said battery box lid on said battery box bottom.

3. The wheelchair battery mounting system of claim 2, wherein
    said battery box straps include a snap buckle assembly, said battery box straps being fastenable together by said snap buckle assembly.

4. The wheelchair battery mounting system of claim 2, further including:
    a groove in said battery box lid, said groove being structured and dimensioned to receive said battery box straps and maintain said battery box straps in place in said groove when said battery box straps are fastened together and across said battery box lid.

5. The wheelchair battery mounting system of claim 1, wherein
    said battery box lid has a perimeter and a protruding rim surrounding said perimeter of said battery box lid, said protruding rim being structured and dimensioned to receive said battery box bottom.

6. The wheelchair battery mounting system of claim 1, further including:
    a battery cord having opposite ends, said battery box lid having an opening therein, said battery cord passing through said opening in said battery box lid, one of said ends of said battery cord being electrically connectable to a wheelchair battery in said battery box assembly, and one of said ends of the battery cord being electrically connectable a wheelchair controller.

7. The wheelchair battery mounting system of claim 1, wherein
    said battery cage is made of a plurality of side bars and a bottom support bar.

8. The wheelchair battery mounting system of claim 1, wherein
    said battery cage is sized so that said battery box assembly snugly fits in said battery cage.

9. The wheelchair battery mounting system of claim 1, wherein
    said bottom and said battery box lid are molded polyethylene.

10. A wheelchair comprising:
    side frame back tubes; and
    a battery mounting system comprising:
        a battery box assembly including:
            a battery box bottom into which a wheelchair battery may be placed;
            a battery box lid engageable with said battery box bottom; and
            battery box straps attached to said battery box bottom, said battery box straps being fastenable together and across said battery box lid when said battery box lid is placed on said battery box bottom;
        a battery support assembly provided to support said battery box assembly, said battery support assembly including:
            a battery cage for supporting said battery box, said battery cage having battery mount brackets; and
            a handle having handle ends provided with battery lock pieces, said handle being pivotally mounted to said battery mount brackets; and
        battery lock receivers mounted on the wheelchair side frame back tubes; said battery lock pieces being engageable with said battery lock receivers when battery support assembly is installed on the wheelchair and said handle is rotated downward to a generally horizontal position.

11. The wheelchair of claim 10, wherein
    said battery box straps include a snap buckle assembly, said battery box straps being fastenable together by said snap buckle assembly.

12. The wheelchair of claim 10, further including:
    a groove molded into said battery box lid, said groove being structured and dimensioned to receive said straps and maintain said straps in place in said groove when said straps are fastened together and across said battery box lid.

13. The wheelchair of claim 10, wherein
    said battery box lid has a perimeter and a protruding rim surrounding said perimeter of said battery box lid, said protruding rim being structured and dimensioned to receive said battery box bottom.

14. The wheelchair of claim 10, wherein a battery cord, said battery box lid has an opening therein, said battery cord passing through said opening in said battery box lid.

15. The wheelchair of claim 10, wherein said battery cage is sized so that said battery box assembly snugly fits in said battery cage.

16. The wheelchair of claim 10, further including:

plates having spaced-apart posts, said battery mount brackets having alignment holes therein, said posts being configured to be accepted by said alignment holes in said battery mount brackets, said alignment holes being positionable over said posts upon lowering said cage onto said plates.

17. A wheelchair comprising:

side frames having back tubes; and a battery mounting system comprising:
- a battery box assembly including:
  - a battery box;
  - a battery box lid having a protruding rim for engaging said battery box bottom, said battery box lid having an opening therein through which a battery cable may pass, said battery box lid further having a groove therein; and
  - battery box straps attached to said battery box bottom, said battery box straps including a snap buckle assembly for fastening said battery box straps together and across said battery box lid when said battery box lid is placed on said battery box bottom, said groove being structured and dimensioned to receive said battery box straps and maintain said battery box straps in place in said groove when said battery box straps are fastened together and across said battery box lid;
- a battery support assembly provided to support said battery box assembly, said battery support assembly including:
  - a battery cage comprising a plurality of side bars and a bottom support bar for cooperatively supporting said battery box, said battery box assembly snugly fits in said battery cage, said battery cage having battery mount brackets having alignment holes therein; and
  - a handle having handle ends provided with interference pieces, said handle being pivotally mounted to said battery mount brackets;
- plates fixed relative to said side frames, said plates having spaced-apart posts configured to be accepted by said alignment holes in said battery mount brackets, said alignment holes being positionable over said posts upon lowering said cage onto said plates; and
- stops mounted on the wheelchair side frame back tubes, said interference pieces being engageable with said stops when battery support assembly is installed on the wheelchair and said handle is rotated downward to a generally horizontal position.

18. A wheelchair battery mounting system for use with a wheelchair having side frames, said battery mounting system comprising:
- a battery box assembly;
- a battery support assembly provided for supporting said battery box assembly, said battery support assembly including:
  - a battery cage;
  - a handle pivotally mounted to said battery cage; and
- a lock comprising:
  - an interference member supported by said handle; and
  - a stop mounted on the wheelchair side frame; said interference member being releasably engageable with said stop when said battery support assembly is installed on the wheelchair and said handle is rotated downward.

19. A wheelchair battery mounting system for use with a wheelchair having side frames, said battery mounting system comprising:
- a battery box assembly including:
  - a battery box bottom; and
  - a battery box lid engageable with said battery box bottom,
- a battery support assembly provided for supporting said battery box assembly, said battery support assembly including:
  - a battery cage;
  - a handle mounted to said battery cage;
- a lock for retaining said battery support assembly in a substantially fixed position; and
- a plate having spaced-apart posts, said battery cage comprising battery mount brackets each having alignment holes therein, said posts being configured to be accepted by said alignment holes in said battery mount brackets, said alignment holes being positionable over said posts upon lowering said battery cage onto said plate.

20. A wheelchair battery mounting system for use with a wheelchair having side frames, said battery mounting system comprising:
- a battery support assembly including:
  - a battery support;
  - a handle pivotally mounted to said battery support; and
- a lock comprising:
  - an interference member supported by said handle; and
  - a stop mounted on the wheelchair side frame; said interference member being releasably engageable with said stop when said battery support assembly is installed on the wheelchair and said handle is rotated.

* * * * *